United States Patent [19]

Goldenberg et al.

[11] Patent Number: 5,060,058
[45] Date of Patent: Oct. 22, 1991

[54] MODULATION SYSTEM FOR PROJECTION DISPLAY

[75] Inventors: Jill F. Goldenberg, Pelham Manor, N.Y.; Wilhelmus A. G. Timmers, Eindhoven, Netherlands

[73] Assignee: U.S. Philips Corporation, New York, N.Y.

[21] Appl. No.: 362,641

[22] Filed: Jun. 7, 1989

[51] Int. Cl.$^5$ .............................................. H04N 9/30
[52] U.S. Cl. ....................................... 358/60; 358/61; 353/34; 359/41
[58] Field of Search .................. 358/60, 61, 63, 65, 358/67; 350/337, 338, 345, 347, 331 R, 401; 352/31, 34; 340/784

[56] References Cited

U.S. PATENT DOCUMENTS

| | | | |
|---|---|---|---|
| 4,191,456 | 3/1980 | Hong et al. | 358/61 |
| 4,345,258 | 8/1982 | Tasai et al. | 353/31 |
| 4,749,259 | 6/1988 | Ledebuhr | 350/337 |
| 4,861,142 | 8/1989 | Tanaka et al. | 350/345 |
| 4,864,390 | 9/1989 | McKechnie et al. | 358/60 |

Primary Examiner—Howard W. Britton
Assistant Examiner—Kim Yen Vu
Attorney, Agent, or Firm—Bernard Tiegerman

[57] ABSTRACT

In a liquid crystal projection t.v. system the color gradient over the projected image, which is due to angular sensitivity of the dichroic mirrors, is minimized by introducing a field lens (61,62,63) next to the light values or LC-panels (21, 22, 23) in the light paths of the blue ($b_B$), green ($b_G$) and red ($b_R$) beams. By chosing different length light paths before and after the light valves and LC-panels a difference in angular sensitivity of the separation mirror (41,42) and the recombination mirrors (52,53) can be compensated for.

4 Claims, 4 Drawing Sheets

MODULATION SYSTEM FOR PROJECTION DISPLAY

The present invention relates to a modulation system for a color projection display comprising at least two light valves, a color separation subsystem for separating an incoming light beam into a number of colored subbeams, each subbeam to be modulated by one of the light valves, a color recombination subsystem for recombining the modulated subbeams to a projection beam, said color separation subsystem and said color recombination subsystem each comprising at least one dichroic mirror having a cut-off wavelength exhibiting a shift in dependence upon an angle of incidence.

BACKGROUND OF THE INVENTION

Since a few years it is proposed to use liquid crystal displays (LCD's) as a primary image source in projection display systems. The use of LCD's in projection displays may be seen in allowed U.S. patent application Ser. No. 292,618, filed Dec. 29, 1988, of the inventor Jill Goldenberg and others.

In an LC-projection system of the kind disclosed in beforementioned applications the beam of light produced by a white light source, such as a tungsten-halogen lamp, is separated by a pair of dichroic mirrors in three subbeams, each one of which contains light of one of the primary colors, red, green and blue. Each of the subbeams is made incident upon a tunable birefringent light valve such as a transmission LCD. The three light valves modulate the three channels to create the red, green and blue portions of a TV picture. The three color portions are then recombined by way of a second set of dichroic mirrors. The recombined light is projected via a projection lens system onto a projection screen.

In the known system the light rays incident upon each picture element (pixel) of a light valve passes through or reflects from only part of each of the dichroic mirrors. For different pixels different although overlapping portions of the mirrors are used for separation and recombination of the subbeams. The average angle at which the light ray pass through or reflect the dichroic mirrors varies in dependence of the position of the pixel in the light valve. As dichroic mirrors have a cut-off wavelength, or a transmission/reflection characteristic, which is angle dependent, this means that different pixels of the same light valve receive and consequently transmit light of a slightly different color. The cut-off wavelength is defined as the wavelength for which 50% of the light is transmitted or reflected. The angle dependent shift in the cut-off wavelength results in a projected color picture exhibiting a monotonic color change from one side of the projected image to the other.

SUMMARY OF THE INVENTION

The present invention contributes significantly to the reduction of the observed color change. In particular it is an object of the invention to provide a modulation system for a color projection television in which the projected image does not exhibit a monotonic color change. It is another object to provide a modulation system in which the remaining color change is reduced as much as reasonably possible.

To this end a modulation system according to the invention comprises a modulation system for a color projection TV comprising at least two light valves, a color separation subsystem for separating an incoming light beam into a number of colored subbeams, each subbeam to be modulated by one of the light valves, and a color recombination subsystem for recombining the modulated subbeams to a projection beam, said color separation subsystem and said color recombination subsystem each comprising at least one dichroic mirror having a cut-off wavelength exhibiting a shift in dependence upon an angle of incidence, whereby said dichroic mirror in the separation subsystem and said dichroic mirror in the recombination subsystem are arranged such that for any picture element in the light valves the average shift in cut-off wavelength of the light rays passing that picture element is substantially equal in size and opposite in sign for the separation and recombination subsystems respectively. By this measure the color change due to the dichroic mirror in the recombination subsystem has a positional dependency opposite to that of the color change due to the separtion subsystem. The observed color change in the projected image is significantly reduced.

The measure according to the invention can be achieved by placing the dichroic mirrors in the separation and recombination subsystems such that they have opposite orientations. However, especially in a modulation system with more than two light valves and subbeams this will interfere with other requirements for an optimum system such as simplicity and compactness of construction and equal path lengths for the respective subbeams. Therefore, a preferred embodiment of the modulation system in accordance to the invention comprises a field lens arranged in the light path of at least one of the subbeams. The field lens inverts the direction of the light rays relative to the optical axis of the system. So the dichroic mirrors of the recombination subsystem may be placed under the same angle with the optical axes as the dichroic mirrors in the separation subsystem whereby it is possible to optimize the optical paths virtually independently from the requirements for reduction of color change.

It is to be noted that the use of a field lens next to the light valves is known per se from the aforementioned allowed U.S. patent application. However, the aim of the known field lens is not to minimize color change but to maximize the amount of light passing through each of the light valves into the projection system. In order to adapt the known system to the requirements for minimization of color change the additional measures in accordance with the invention have to be taken.

In a practical embodiment it cannot always be realized that the dichroic mirror in the separation subsystem and the corresponding dichroic mirror in the recombination subsystem have an identical angular dependency of the cut-off wavelength. In order to achieve minimal color change in such a system the modulation system according to the invention comprises a dichroic mirror in the separation subsystem and a corresponding dichroic mirror in the recombination subsystem, which dichroic mirrors have different angular dependencies of the cut-off wavelength, which modulation subsystem is to be placed in between a light source and a projection system having an entrance pupil, said modulation subsystem comprising a field lens providing a first effective image of the light valve at a first effective position as seen from the light source and a second effective image of the light valve at a second effective position as seen from the entrance pupil and a magnification being the ratio of the size of the first and second effective images of the light valve, whereby the light valve and the field lens are arranged at positions such that the ratio between a distance from the light source and said first effective position and a distance between said second effective position and the entrance pupil is equal to the ratio between said angular dependencies of the cut-off wavelength times said magnification.

With the effective image of the light valve is meant the image as seen from the position of the entrance pupil of the projection system or from the position of the light source. When the field lens is arranged in between the light valve and the entrance pupil the aforementioned first effective image coincides with the light valve and also when the field lens is located between the light valve and the light source the second effective image is the light valve itself. The light source may be an image of the actual light source provided by a collimating system. Likewise, the above mentioned entrance pupil can be located at a plane that is imaged by an optical system at the actual entrance pupil of the projection lens system. The correction due to the different angular dependencies of the transmission/reflection characteristics can be achieved by adapting the field lens such that the average angles of the partial beams passing through a pixel have a corresponding difference.

BRIEF DESCRIPTION OF THE DRAWINGS

The structure and arrangement of the modulation system will be illustrated, without limitation, in the attached drawing in which.

DETAILED DESCRIPTION OF THE INVENTION

Figure 1:
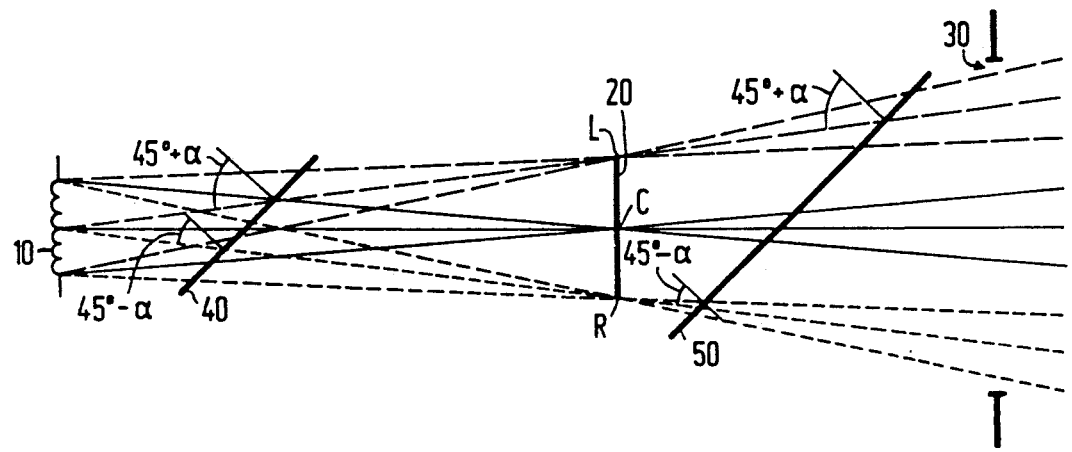
FIG. 1 shows the light path of one channel through one light valve of a conventional LC projection system.

FIG. 1 shows the light path of one of the subbeams in a LC-projection system. A light source 10, for example an image of a tungsten-halogen lamp, illuminates a light valve or LCD 20. The light valve modulates the light incident thereupon in accordance with a video program, delivered by an image generator (not shown) for example a TV-tuner, VCR, or any other suitable source. The modulated light is transmitted into the entrance pupil 30 of a projection lens system, for projection of an image of the light valve on a screen.

In the light path or channel of this one subbeam two dichroic mirrors are arranged. A first mirror 40 for separating the relevant color from the white beam which is emitted by light source 10 and a second mirror 50 for recombination of the subbeam in this channel with the other subbeams after modulation by the light valves in the other channel or channels. Both dichroic mirrors are shown as transmission mirrors.

On the light valve three representative pixels are indicated, a pixel C at the center of the light valve and two pixels L and R at two opposite edges, for example, the left and right edges, respectively. The light radiated by the light source 10 and transmitted through the pixel C is on average incident with an angle of 45° on both mirrors 40 and 50. The light passing through pixel L is, on average, incident with an angle larger than 45°, in the Figure the angle is indicated as 45°+α, and the light passing through pixel R is incident on both mirrors with an average angle 45°−α. As the transmission characteristic of a dichroic mirror is a function of the angle of incidence the color of the light passing through the three pixels shown is somewhat different for each of the pixels. In practical embodiments the angle α normally does not exceed approximately 5°.

Figure 2:
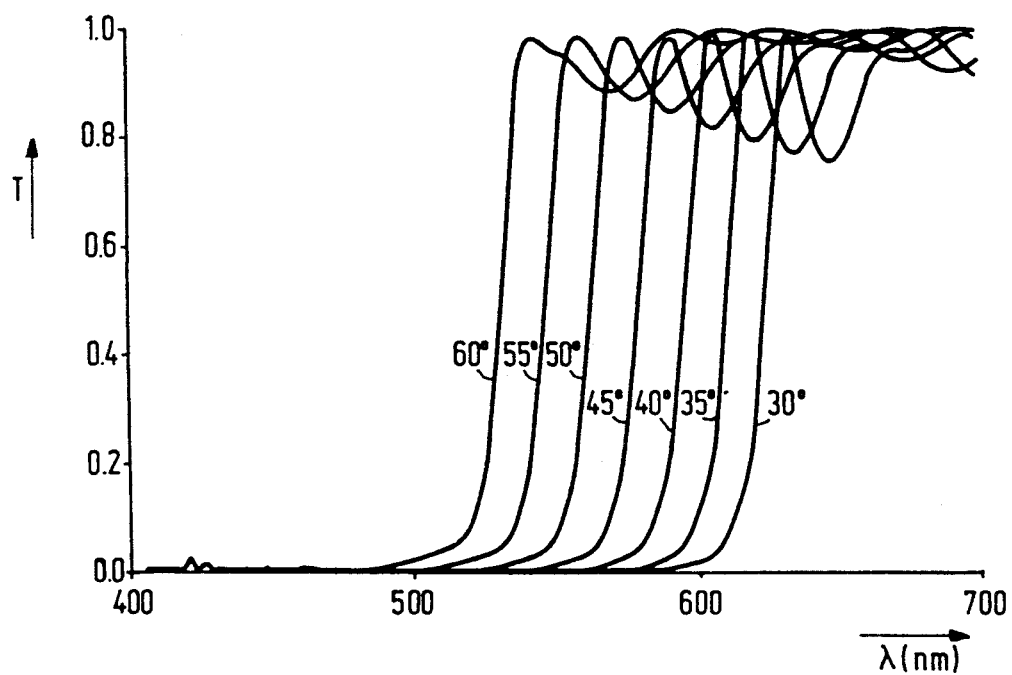
FIG. 2 shows the transmission function of a typical red dichroic filter at various angles of incidence.

This is further illustrated in FIG. 2 which shows the transmission characteristic for a typical red dichroic filter for various angles of incidence between 30° and 60°. The cut-off wavelength, the wavelength at which the transmission coefficient is 50%, is angle dependent. This Figure shows that the transmission characteristic shifts as a function of the angle of indicence. This dependence means that the light passing through pixel L contains a larger amount of yellow light than the light passing through pixel C, and that the light passing through pixel R contains less yellow and therefore relatively more red, than light passing through the center of the light valve (pixel C). The total result is that the image seen by an observer is somewhat yellowish at one side and sowewhat reddish at the opposite side of the image. A corresponding analogous effect occurs in the blue/green mirrors of a projection TV system, resulting in images that contain somewhat more blue at one edge and somewhat more green at the other edge. As the deviation from 45° is no more than approximately 5° the angular dependency can be considered as merely a shift of the transmission/reflection characteristics, the variation in the fluctuations at the top of the curves can be ignored.

Figure 3A:
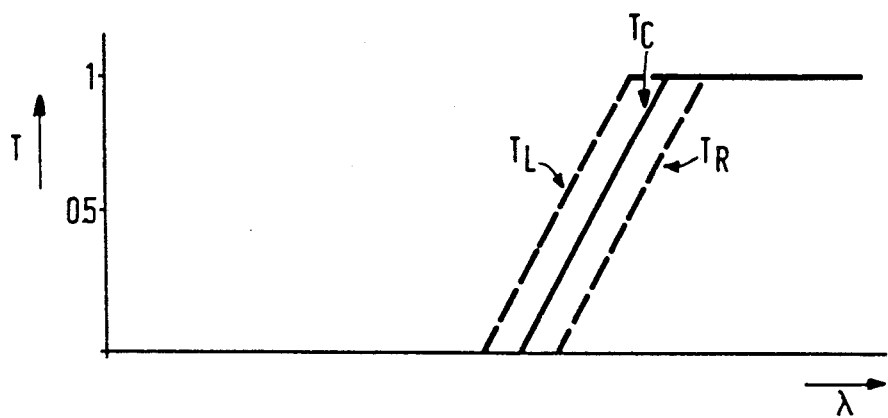
FIGS. 3a, 3b and 3c show the transmission characteristics for light in the red channel due to each of the dichroic mirrors and the composite transmission characteristics, respectively.
Figure 3B:
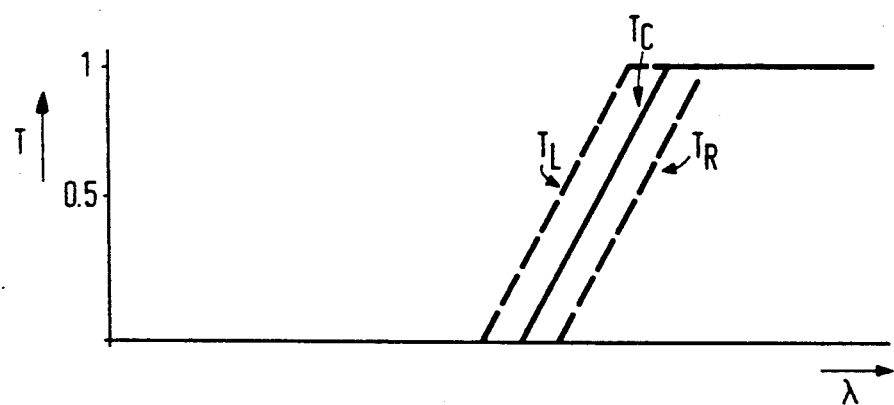
Figure 3C:
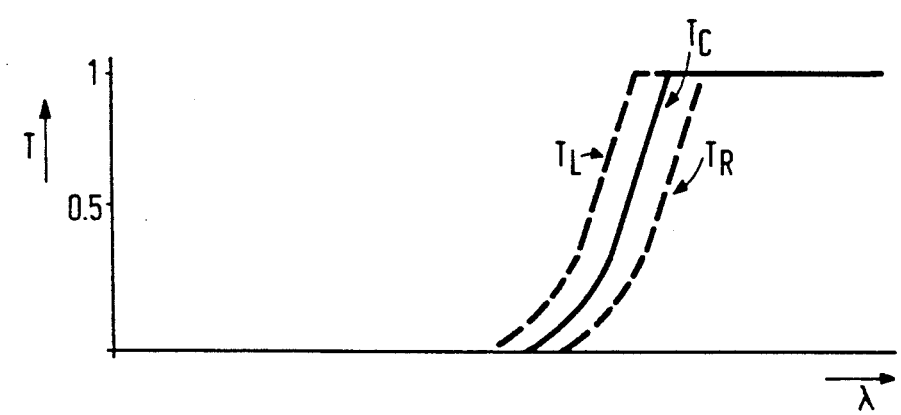

The color change is also illustrated in the FIGS. 3a, 3b and 3c. In these Figures the transmission characteristics of the separation dichroic mirror, the recombination dichroic mirror and the total transmission characteristic, respectively, are shown as a function of the wavelength. For clarity, the steepness of the function is reduced compared to a real dichroic mirror. In each of the Figures the lines $T_L$, $T_C$ and $T_R$ show the transmission characteristic as a function of the wavelengths for light passing through the pixels L, C and R, respectively. From this Figure it is clear that the combination of the mirrors in a conventional modulation system gives rise to a colorchange in the projected image, and that the mutual arrangement of the dichroic mirrors may enhance the effect. The term "transmission characteristics" is also meanst to include the reflection characteristic if the particular channel is for a color that is reflected at the mirrors 40 and/or 50.

Figure 4:
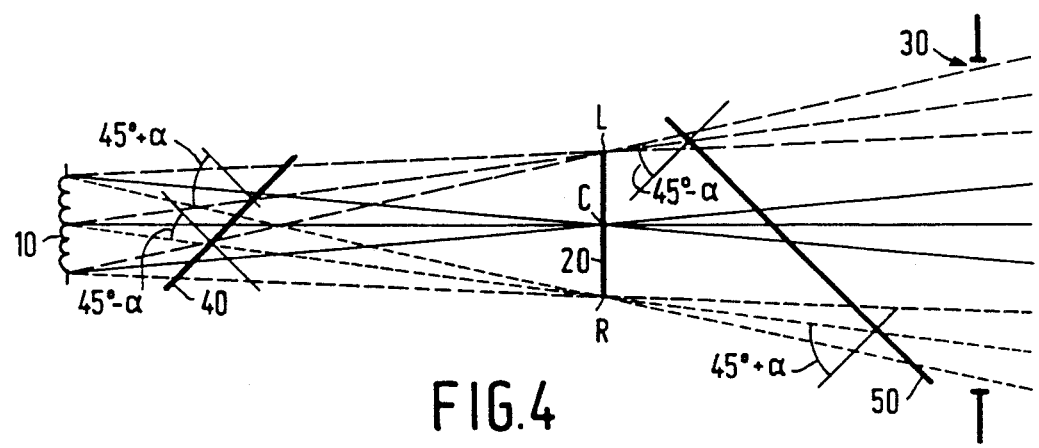
FIG. 4 shows the light path of one channel through one light valve in a modulation system according to the invention.

FIG. 4 shows a first embodiment of the modulation system in accordance to the invention. The Figure shows a light path similar to the one shown in FIG. 1. Identical elements are referred to by identical reference signs. The recombination dichroic mirror 50 is placed at an opposite angle relative to the optical axis as the equivalent mirror (50) in FIG. 1. This has the effect that light incident with an angle larger than 45° at the separation dichroic mirror 40 is incident with an angle smaller than 45° at the recombination mirror. The color change caused by each of the two mirrors is not additional anymore in this case, resulting in less color change over the image seen by an observer.

Figure 5A:
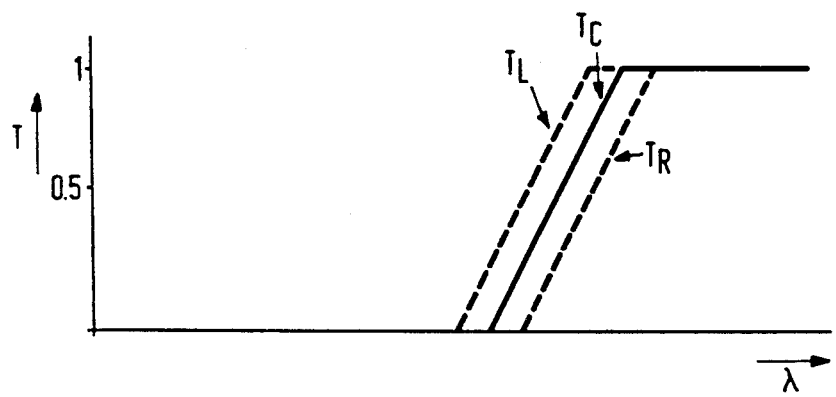
FIGS. 5a, 5b and 5c show the transmission characteristics of a modulation system according to the invention.
Figure 5B:
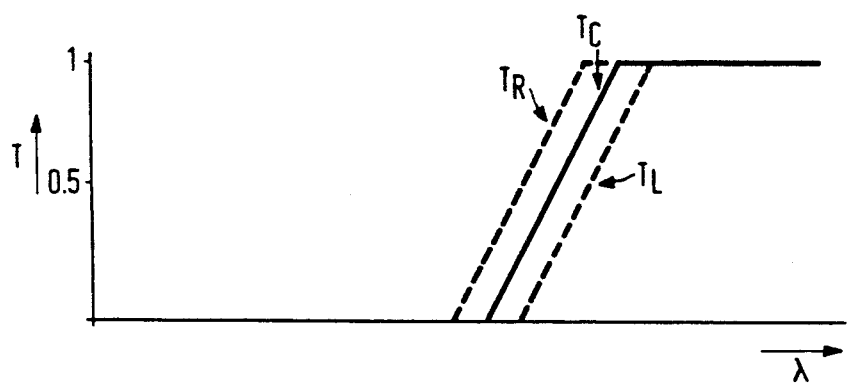
Figure 5C:
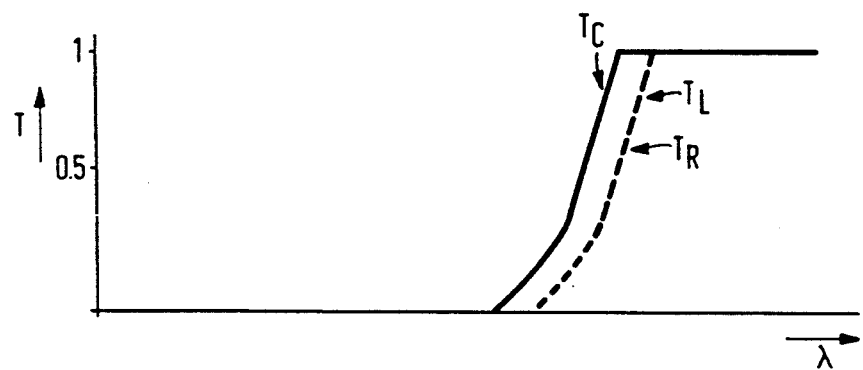

The effect is illustrated in FIGS. 5a, 5b and 5c which are equivalent to the FIGS. 3a, 3b and 3c. For the pixel R the transmission coefficient of the whole system for red light is dominated by the separation dichroic mirror 40, while the recombination mirror 50 transmits most of the light already passed through the separation mirror as the transmission/reflection characteristic is shifted towards the shorter wavelengths. It can be said that for pixel R the transmission window of mirror 50 is wider than the transmission window of mirror 40. For pixel L the recombination mirror 50 is the dominant one, as the light passing through this pixel passes the separation mirror 40 with a wider transmission window than it passes the recombination mirror 50. The net result is, as shown in FIG. 5c, that the pixels R and L are subject to the same amount of color change. Therefore the color change over the whole of the image seen by the observer is only one half of the color change in the known modulation system. Like in the known system the color change is minimum in the center of the image, but contrary to the known system the color change evolves into the same direction towards both edges of the image.

In practical embodiments, where the separation and the recombination subsystems employ each two dichroic mirrors it is difficult to place the recombination mirrors at opposite angles to the separation mirrors relative to the optical axis while maintaining other desired features of the modulation system such as equal length light paths between the light source, the light valves and the entrance pupil of the projection lens system.

Figure 6:
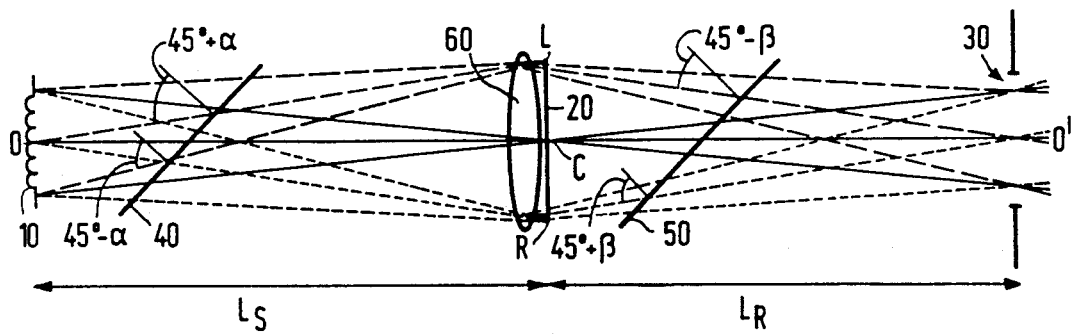
FIG. 6 shows another embodiment of the modulation system according to the invention.

In FIG. 6 a preferred embodiment of the modulation system according to the invention is shown. This figure very much resembles FIGS. 1 and 4 and identical elements are represented by identical reference signs. In FIG. 6 the separation mirror 40 and the recombination mirror 50 are both arranged at the same angle of 45° with the optical axis 0—0′ of the system parallel to each other. Besides the light valve 20 a field lens 60 is arranged that inverts the direction of the light passing therethrough with respect to the optical axis 0—0′. The field lens 60 is preferably arranged such that it images the light source 10 upon the entrance pupil 30 of the projection lens system, however, this is not necessary for the present invention. Due to the lens 60 the light that passes pixel L and crosses the separation mirror 40 at an average angle of $45° + \alpha$ passes the recombination mirror 50 at an angle of $45° - \beta$. The light passing pixel R crosses the separation mirror at $45° - \alpha$ and the recombination mirror at $45° + \beta$. So, the total color change produced in the modulation system shown in FIG. 6 is equivalent to the color change as produced in the arrangement shown in FIG. 4, provided the angle $\alpha$ equals the angle $\beta$.

In a practical modulation system it cannot always be achieved that the light being reflected or transmitted at a separation dichroic mirror is equally reflected or transmitted at the corresponding recombination dichroic mirror. Therefore, the two mirrors will be different in some cases and the transmission characteristic at the separation mirror as a function of the angle of the incident light can be different from the reflection or transmission characteristic of the corresponding recombination mirror. Although the angle at which the light beams are incident upon the two mirrors is the same, a more than minimum color change will result.

Figure 7:
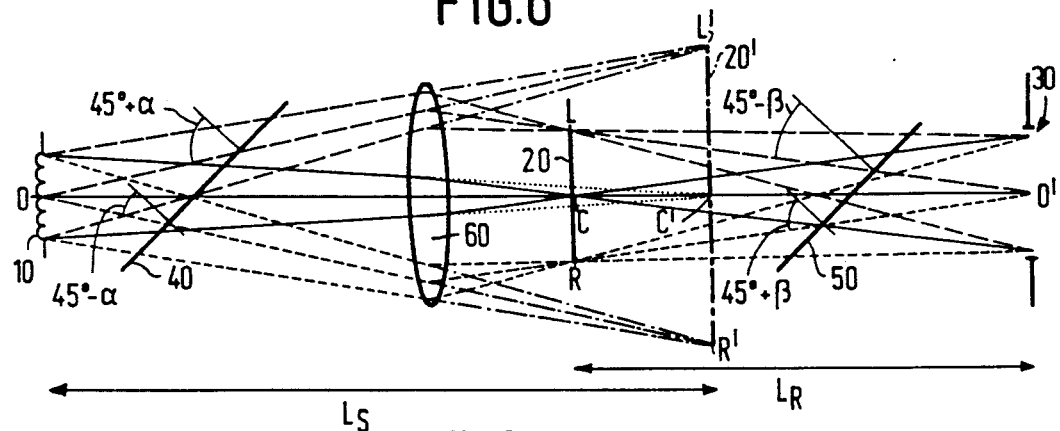
FIG. 7 shows an embodiment in which the dichroic mirrors have unequal angular dependencies.

To overcome this problem it is necessary to adjust the average angles between the partial beams passing through each pixel and the recombination and separation mirrors to a corresponding difference. So, light incident at separation mirror 40 at an angle $45° + \alpha$ will be incident at the recombination mirror at an angle $45° - \beta$. This is illustrated in FIG. 7. In this Figure elements corresponding to elements in embodiments shown before are indicated with identical reference signs. In the shown embodiment the field lens 60 does not merely change the sign of the angle of the partial beams passing the pixels L, C and R, but also the value of the angles. Therefore, the partial beam passing through pixel L is incident at the separation mirror 40 with an average angle of $45° + \alpha$ and the recombination mirror 50 with an average angle $45° - \beta$. For minimum color change the ratio between $\alpha$ and $\beta$ should be equal to the ratio between the angular dependencies of the shift of the cut-off wavelength of the two dichroic mirrors 50 and 40.

As the angles $\alpha$ and $\beta$ are small, normally no larger than approximately 5°, the ratio between $\alpha$ and $\beta$ is equal to the ratio between the size of the image L′ divided by the distance $L_S$ between the image and the light source 10 and the size of the light valve L divided by the distance $L_R$ between the light valve L and the entrance pupil 30. The image L′ is the image of the light valve L as seen from the light source through the lens 60. In other words, for minimum color change the ratio between the angular dependencies of the cut-off wavelengths of the recombination mirror 50 and the separation mirror 40 should be equal to the ratio between the distance $L_R$ and $L_S$ times the magnification of the light valve due to field lens 60. Of course an analogous situation occurs when the field lens is placed between the light valve and the entrance pupil in which case $L_R$ is the distance between the image of the light valve as seen through by the field lens and the entrance pupil and $L_S$ is the distance between the light source and the light valve. It can also be imagined that the field lens 60 is split in two lenses, one at each side of the light valve in which case both images have to be taken into account.

When the field lens is placed very close to the light valve, as in FIG. 6, the image nearly coincides with the light valve itself and the distances $L_R$ and $L_S$ can be taken as from the light valve and the magnification can be approximated by unity.

When the deviation of the average angle of the light passing through a pixel is significantly more than 5° from the angle between the optical axis and the mirror, the calculation must be adapted to that situation. Not only the approximation of the angles $\alpha$ and $\beta$ by the ratio between the size of the light valve and the distance to the image source or entrance pupil is no longer valid, but also the implied approximation that the shift of the cut-off wavelenght as as function of the incident angle is linear no longer holds. The optimum color change may be then achieved by introducing a small offset in the angle of the dichroic mirrors and or by introducing an asymmetric optical element such as a prism in the optical path. In a modulation system with more than two colored beams and more than two light valves it may be impossible to obtain the correct ratio in each of the channels simultaneously and a compromise may be necessary.

Figure 8:
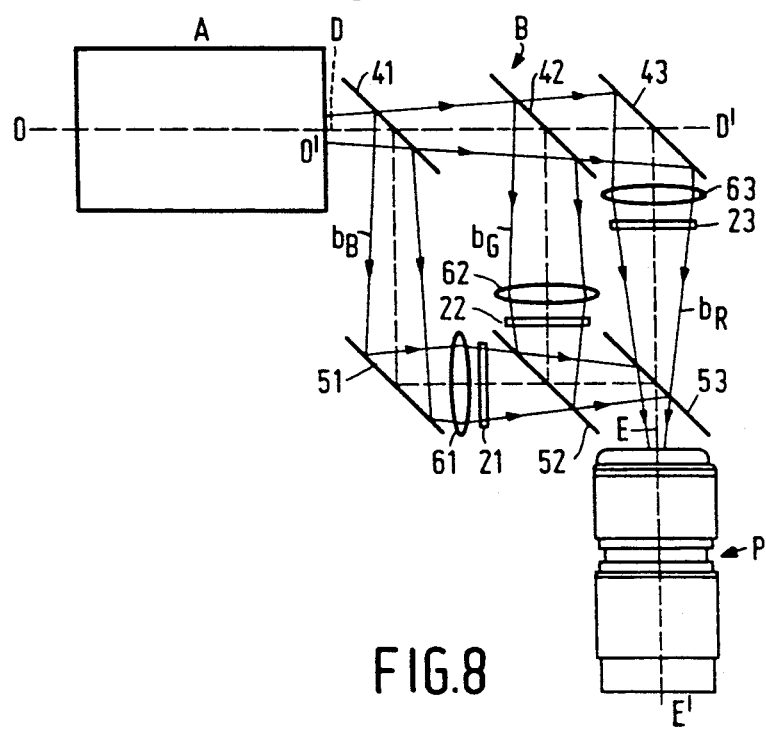
FIG. 8 shows an embodiment of a modulation system according to the invention for a three color projection TV device.

FIG. 8 shows an embodiment of a three color projection television device. This device comprises three main sections: the illumination system A, the picture modulation system B and the projection lens system P, for example a zoom lens. The principal axis 00' of the illumination system is in alignment with the optical axis DD', which in the embodiment shown is firstly divided into three sub-axes for colour projection, which sub-axes are later combined again to one optical axis coinciding with the optical axis EE' of the projection lens system.

The beam from the illumination system A is incident on a color-selective reflector 41, for example a dichroic mirror which reflects, for example, the blue color component $b_B$ and passes the rest of the beam. This beam portion encounters a second color-selective reflector 42 which reflects the green color component $b_G$ and passes the remaining red color component $b_R$ to a reflector 43 which reflects the red beam to the projection lens system. The reflector 43 may be a neutral reflector or a reflector which is optimized for red light. The blue beam is reflected by a neutral or blue-selective reflector 51 to a light valve 21 in the form of a liquid crystal panel. This light valve is electronically driven in known manner so that the blue component of the image to be projected appears on this panel. The beam modulated with the blue information reaches the projection lens system P via a color-selective reflector 52 which passes the blue beam and reflects the green beam and a further color-selective reflector 53 which reflects the blue and green beams. The green beam $b_G$ traverses a second light valve 22 where it is modulated with the green picture component and is then reflected to the projection lens system P successively by the color-selective reflectors 52 and 53. The red beam $b_R$ traverses a third light valve 23 where it is modulated with the red picture component and subsequently reaches the projection lens system via the color-selective reflector 53.

The blue, red and green beams are superimposed at the entrance of this lens system so that a color picture is created which is imaged in a magnified form by this system on a projection screen, not shown in FIG. 8.

The optical path lengths between the exit of the illumination system A and each of the light valves 21, 22 and 23 are preferably equal so that the cross-sections of the beams $b_B$, $b_G$ and $b_R$ are equal at the area of their respective display panels. Also the optical path lengths between the light valves 21, 22 and 23 and the entrance aperture of the projection lens system should be equal so that the differently colored scenes are satisfactorily superimposed on the projection screen.

In order to achieve a minimal color change over the image observed by a viewer field lenses 61, 62 and 63 are arranged next to the light valves 21, 22 and 23. These field lenses change the divergent beams incident upon the separation mirrors 41 and 42 to convergent beams incident upon the recombination mirrors 52 and 53. The color change caused by the separation mirrors is therefore no longer enhanced by the recombination mirrors.

The field lenses may have additional functions such as concentrating the light emitted by the light source 10 upon the light valves 21, 22 and 23 by imaging the exit plane of the illumination system A upon the entrance pupil of the projection lens system P. The field lenses may be composed of several lens elements, arranged at one or at both sides of the light valves.

In a practical embodiment the transmission characteristics of the recombination mirrors may be different from that of the corresponding separation mirrors. In a realized example the separation mirror which seperates the blue beam from the green and red beams (mirror 41 in FIG. 8) has a cut-off wavelength which changes 1.1 nm/degree while the corresponding blue/green flange in the recombination mirror (52 in FIG. 8) changes with a rate of 1.8 nm/degree. For an optimal adaptation between the recombination mirror and the separation mirro this would means that the distance between light valve and projection lens system should be 1.6 times larger than the distance between light source and light valve. However, the cut-off wavelength at the red/green flange of the separation and recombination mirrors (42 and 53, respectively in FIG. 7) changes at a rate of 1.5 nm/degree for both mirrors, so that equal path lengths before and after the light valves are required. For this example a compromise was chosen in which the path length between light valves and projection lens was 1.34 times larger than the path length between the illumination system and the light valves.

It will be apparent for the person skilled the art that the dichroic mirrors are set at 45° relative to the indicent beams only by way of example. The invention can be readily applied with the dichroic mirrors set at any other suitable angle.

We claim:

1. In a modulation system for a color projection display comprising:
    at least two light valves each of which defines a plurality of picture elements;
    a color separation subsystem for separating an incoming light beam into a number of colored subbeams, each subbeam being modulated by one of the light valves; and
    a color recombination subsystem for recombining the modulated subbeams to a projection beam, said color separation subsystem and said color recombination subsystem each comprising at least one dichroic mirror having a cut-off wavelength exhibiting a shift in dependence as a function of an angle of incidence;
    the improvement wherein the dichroic mirror in the separation subsystem and the dichroic mirror in the recombination subsystem are arranged in relation to one another such that, for all picture elements of the light valves, an average shift in cut-off wavelength in the separation and recombination subsystems for light rays passing through each picture element is substantially equal in size and opposite in sign.

2. The modulation system of claim 1, comprising three light valves wherein the separation subsystem and recombination subsystem each comprise two dichroic mirrors.

3. The modulation system of claim 1, further comprising a field lens arranged in the light path of at least one of the subbeams.

4. The modulation system of claim 3 wherein the angular functional dependencies of the cut-off wavelengths of a dichroic mirror in the separation subsystem and a corresponding dichroic mirror in the recombination subsystem are different, and wherein the modulation subsystem is placed between a light source and a projection system having an entrance pupil and includes field lens means which produces a first effective image of the light valve at a first effective position as seen from the light source and a second effective image of the light valve at a second effective position as seen from the entrance pupil and a magnification which is the ratio of the size of the first and second effective images of the light valve, the light valve and the field lens means being arranged at positions such that the ratio between a distance from the light source and said first effective position and a distance between said second effective position and the entrance pupil is equal to the ratio between said angular dependencies of the cut-off wavelength multiplied by said magnification.

* * * * *